United States Patent [19]

Martin et al.

[11] 4,239,145
[45] Dec. 16, 1980

[54] APPARATUS FOR WELDING EDGE BARS TO BAR GRATES

[76] Inventors: Hans Martin, Arfkamp 14; Wilhelm Herbst, Vockengraben 30, both of 4424 Stadtlohn, Fed. Rep. of Germany

[21] Appl. No.: 951,249

[22] Filed: Oct. 13, 1978

[30] Foreign Application Priority Data

Oct. 19, 1977 [DE] Fed. Rep. of Germany ....... 2746866

[51] Int. Cl.³ ............................................ B23K 37/04
[52] U.S. Cl. .................................... 228/6 R; 228/47; 228/49 R; 29/429
[58] Field of Search .................. 228/4.1, 5.1, 6 R, 47, 228/49 R, 49 A; 29/429, 430; 219/79; 198/345

[56] References Cited

U.S. PATENT DOCUMENTS

| | | | |
|---|---|---|---|
| 2,164,567 | 7/1939 | Burke | 228/6 R X |
| 3,507,024 | 4/1970 | Powers et al. | 29/430 X |
| 3,711,010 | 1/1973 | McConnell | 228/182 X |
| 3,872,815 | 3/1975 | Kawai et al. | 228/47 X |

FOREIGN PATENT DOCUMENTS 1565688  1/1971  Fed. Rep. of Germany .

*Primary Examiner*—Kenneth J. Ramsey
*Attorney, Agent, or Firm*—Merchant, Gould, Smith, Edell, Welter & Schmidt

[57] ABSTRACT

A method and apparatus for welding edge bars (4, 5) to the ends of the support bars and filling bars of bar grates (6, 7) is disclosed. The apparatus includes two rollerway sections (1, 2) on either side of a work station. A lift device (3) supports two edge bars (4, 5) and is moveable into and out of the region of the work station. A welding device (8) is also moveable into and out of the region of the work station. Stop bars (12, 14) are provided for aligning the grates (6, 7) in a longitudinal direction. The bar grates (6, 7) are aligned in the other direction against the edge bars (4, 5). Rollers (17, 18) are pivotable into and out of the work station area to transfer a first bar grate (6) to the second roller section (2) after a welding operation.

3 Claims, 3 Drawing Figures

APPARATUS FOR WELDING EDGE BARS TO BAR GRATES

TECHNICAL FIELD

The invention relates to a method of welding edge bars to the ends of the support bars and filling bars of bar grates aligned by means of stops and anchored by holding devices. The invention also relates to an apparatus for performing such a method.

BACKGROUND OF THE PRIOR ART

A method of and an apparatus for welding such an edge bar to the ends of the support bars and filling bars of a bar grate are described in Federal Republic of Germany-Auslegeschrift No. 15 65 688. The procedure of this known method is substantially that an edge bar is brought up to a bar grate, anchored stationarily upon the welding bench and is then welded to the bar grate. In this case it is necessary to turn the bar grate four times so as to introduce the necessary edge bar on all four sides. The known method, which is still practiced on a large scale nowadays, is relatively extravagant of time and therefore of cost.

BRIEF SUMMARY OF THE INVENTION

The underlying aim of the invention is to develop a method of welding the edge bars which can be incorporated into a continuous transport line in which the production of the bar grates is performed, so that the welding on of the edge bars can also be performed continually in this continuous production line for bar grates.

This aim underlying the invention is achieved substantially in that the bar grates without edge bars are fed on a transport device, e.g., a rollerway, to a work station and a grate is stopped on each of the two sides of the work station. Edge bars are guided into a position of alignment vertically and in the transport direction of the bar grates, whilst the bar grates are now guided into abutment with said edge bars and additionally with a stationary stop extending in the transport direction.

By this means it is achieved that two bar grates are pressed against two edge bars and are simultaneously aligned during said pressing operation.

These prepared bar grates, being held in this prepared position, can now be welded by welding processes customary and known per se, whilst the further transport of the bar grates can then occur so that now in this further transport path the grates are turned and the lateral edge bars are welded on.

By this means, then, a continuous work procedure is created whereby two bars are welded onto two different grates simultaneously in one welding station, i.e., two bar grates are served simultaneously by one welding device and one lift device without human operators being necessary for this purpose, because the transporting of the bar grates into the work station and the various work strokes, such as raising the edge bars, lowering the welding devices, etc., can take place automatically in that the incoming bar grates themselves operate the tripping mechanisms for these devices through corresponding limit switches.

The appartus for performing the method according to the invention is characterized substantially by two rollerway sections one on each side of the work station, a lift device accommodating the two edge bars and rollers transportable into and out of the region of the work station which become operative when the welding operation for the edge bars has been performed and the further transport of the bar grates takes place.

An exemplary embodiment of the invention is explained hereinbelow with reference to the accompanying drawing.

DETAILED DESCRIPTION OF THE INVENTION

Figure 1:
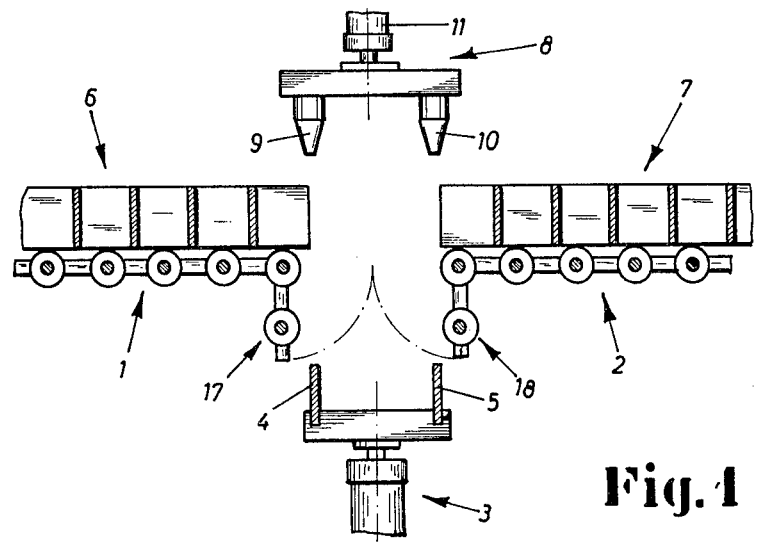
FIG. 1 is a schematic side elevation of an apparatus constructed according to the invention.
Figure 2:
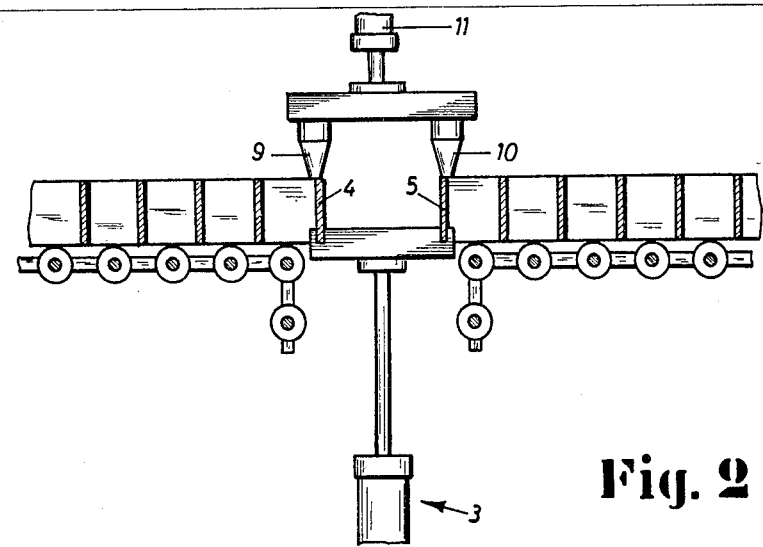
FIG. 2 is an elevation according to FIG. 1 in a different stage of the method.

In the drawing two rollerways are designated 1 and 2. The rollerways 1 and 2 may include driven rollers and are arranged on both sides of a work station. This work station substantially comprises a lift device 3 for lifting edge bars 4 and 5. The edge bars 4, 5 can be placed upright on edge on the lift device 3. The lift device 3 can now guide the edge bars 4 and 5 to such a height that they are precisely aligned with bar grates 6 and 7 resting upon the rollerways 1 and 2.

Above the lift device 3 there is arranged a welding device 8 which carries e.g., two welding guns 9 and 10. This welding device 8 is likewise raisable and lowerable through a corresponding lift device 11 and can thus be lowered into the actual work region or raised into a nonobstructive rest position.

Figure 3:
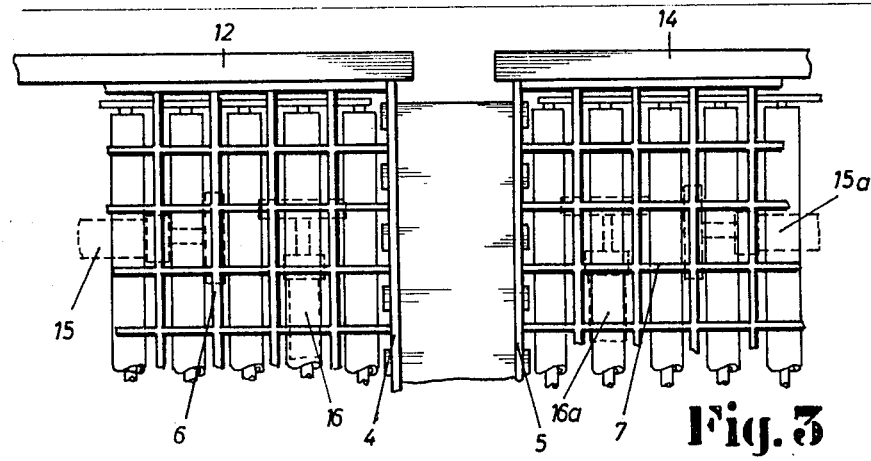
FIG. 3 is a plan view of the apparatus according to the invention.

As may be seen from FIG. 3, a stop 12 or 14 is provided aligned and arranged in the longitudinal direction of each of the rollerways 1 and 2. In the region in front of the actual work station and behind the actual work station, hydraulic cylinders 15 and 16 or 15a and 16a are arranged which, when a bar grate 6 or 7 has rolled into the region in front of the work station, now bring said bar grate into abutment with the stop 12 or 14. Simultaneously however this bar grate is also guided into abutment with the edge bar raised into the work position.

At this stage of the method, therefore, the bar grates 6 and 7 are in abutment both against the stops 12 and 14 and against the edge bars 4 and 5, and are thus automatically aligned and exhibit the necessary contact pressure for the welding to the edge bar which is to be performed next.

Following this work stage the welding device 8 now descends and performs the welding. The welding device 8, as is known per se, can be transported across the bars transversely to the transport direction of the bar grates 6 and 7 and in doing so now welds the individual ends of the filling or support bars to the edge bars 4, 5.

As soon as the welding device 8 has attained its limit position, a raising of the welding device 8 and a lowering of the lift device 3 may occur by automatic control. Now the resulting interstice between the rollerways 1 and 2 is closed by the rollers 17 and 18 pivotable into that region and a further transport of the bar grates 6 and 7 occurs in such a way that the bar grate 6 enters the position in which the bar grate 7 is illustrated in the drawing. A fresh work cycle can now take place - i.e., an edge bar 5 is now welded to the rear edge of the bar grate 6.

It is immediately clear from the drawing and from the foregoing description that by virtue of the method according to the invention and of the apparatus suitable for the same, an automatic welding of edge bars to bar grates is performed. In fact two edge bars are welded simultaneously to two bar grates and it is possible to include this work station in a continuous work process, because the alignment and preparation of the grates for the performance of the welding is effected automatically by the cylinders 15 and 16. In this context it is of course also possible that only one cylinder is provided, which is aligned diagonally and ensures the necessary sliding of the grate upon the rollerway.

It should be pointed out at this juncture that it is of course also possible for the edge bars 4 and 5 to be guided outwards and thus brought into abutment with the bar grates 6, 7, and not the bar grates 6, 7 into abutment with the edge bars 4, 5.

A substantial advantage of the method according to the invention is furthermore to be seen in the fact that the operator of the apparatus has nothing further to do with the handling and alignment of the grates, but the grates are automatically brought up via the rollerways and automatically positioned, so that the operator merely has to supervise the mechanical devices.

Lastly it is possible that only a single edge bar is welded on by this device, so that the machine is not restricted to the double embodiment and it is possible to weld different edge bars 4 and 5 to the grates in one work stage, so that e.g., a different edge bar is provided on the front side of a grate from that on the rear side of a grate.

What is claimed is:

1. An apparatus for welding edge bars to the edges of support bars and filling bars of bar grates comprising:
    a work station;
    a first rollerway section disposed on a first side of said work station for supporting and transporting bar grates;
    a second rollerway section disposed on a second side of said work station for supporting and transporting bar grates;
    transporting means comprising at least a third rollerway section movable into and out of the region of said work station for transporting the bar grates between said first and second rollerway sections;
    means for moving said at least third rollerway section out of a space between facing ends of said first and second rollerway sections during a welding operation and for moving said at least third rollerway section into said space during the transporting of bar grates from said first to said second rollerway section;
    means for holding a pair of edge bars;
    means for moving said edge bar holding means into said space during the welding operation and for moving said edge bar holding means out of said space during the transporting of bar grates from said first to said second rollerway sections;
    means for welding edge bars to the support and filling bars of bar grates, said welding means being movably disposed at said work station, said apparatus including stop means aligned along the transporting direction of said rollerway sections, means for guiding a bar grate into alignment with said stop means to align the bar grate in a first direction, and means for moving a bar grate into alignment with an edge bar when it is held by said holding means at said work station to align a bar grate in a second direction.

2. An apparatus in accordance with claim 1 wherein said edge bar holding means is arranged for upward and downward motion into said space between said first and second rollerway sections.

3. An apparatus in accordance with claim 2 wherein said at least third rollerway section is comprised of a third rollerway section and a fourth rollerway section, said third rollerway section being pivotably connected to the facing end of said first rollerway section and said fourth rollerway section being pivotally connected to the facing end of said second rollerway section.

* * * * *